US010989246B2

(12) United States Patent
 Sicard

(10) Patent No.: US 10,989,246 B2
(45) Date of Patent: Apr. 27, 2021

(54) ANTI-VIBRATION FASTENER

(71) Applicant: Richard C. Sicard, Stoughton, MA (US)

(72) Inventor: Richard C. Sicard, Stoughton, MA (US)

( * ) Notice: Subject to any disclaimer, the term of this patent is extended or adjusted under 35 U.S.C. 154(b) by 222 days.

(21) Appl. No.: 16/198,357

(22) Filed: Nov. 21, 2018

(65) Prior Publication Data

US 2020/0158159 A1 May 21, 2020

(51) Int. Cl.
*F16B 39/18* (2006.01)
*F16B 39/16* (2006.01)
*F16B 35/04* (2006.01)

(52) U.S. Cl.
CPC .............. *F16B 39/18* (2013.01); *F16B 39/16* (2013.01); *F16B 35/041* (2013.01)

(58) Field of Classification Search
CPC ........ F16B 39/18; F16B 39/16; F16B 39/128; F16B 39/126
USPC .......................... 411/222, 234–245, 931, 389
See application file for complete search history.

(56) References Cited

U.S. PATENT DOCUMENTS

| 655,704 | A | * | 8/1900 | Gage | F16B 39/36 |
| | | | | | 411/226 |
| 778,107 | A | * | 12/1904 | Burks | F16B 39/16 |
| | | | | | 411/243 |
| 857,526 | A | * | 6/1907 | Knopf | F16B 39/16 |
| | | | | | 411/243 |
| 876,081 | A | * | 1/1908 | Orr | F16B 39/02 |
| | | | | | 411/263 |
| 889,319 | A | * | 6/1908 | Martin | F16B 39/36 |
| | | | | | 411/268 |
| 921,003 | A | * | 5/1909 | Roberts | F16B 39/16 |
| | | | | | 411/243 |
| 1,077,119 | A | * | 10/1913 | Bixby | F16B 39/16 |
| | | | | | 411/243 |
| 1,413,024 | A | * | 4/1922 | Harrell | F16B 39/16 |
| | | | | | 411/243 |
| 1,806,506 | A | * | 5/1931 | Savidge | F16B 39/36 |
| | | | | | 411/237 |
| 2,024,593 | A | * | 12/1935 | Moore | B21K 1/48 |
| | | | | | 470/11 |
| 2,060,593 | A | * | 11/1936 | Schaurte | F16B 31/06 |
| | | | | | 470/11 |

(Continued)

OTHER PUBLICATIONS

Wikipedia, Square Nut, Dec. 28, 2016, <https://web.archive.org/web/20161228021318/https://en.wikipedia.org/wiki/Square_nut> (Year: 2016).*

*Primary Examiner* — Victor D Batson
*Assistant Examiner* — Amit Singh Dhillon
(74) *Attorney, Agent, or Firm* — The Iwashko Law Firm, PLLC; Lev Ivan Gabriel Iwashko

(57) ABSTRACT

An anti-vibration fastener, including a square flange bolt to affix a first object to a second object, the square flange bolt including a first threaded portion disposed at a front end of the square flange bolt, and a second threaded portion disposed at a rear end of the square flange bolt having a diameter smaller than a diameter of the first threaded portion, and a forward nut to encapsulate at least a portion of the square flange bolt such that the first object and the second object are disposed between the forward nut and the front end of the square flange bolt, and an aft nut to encapsulate at least a portion of the square flange bolt and the forward nut.

5 Claims, 11 Drawing Sheets

(56) References Cited

U.S. PATENT DOCUMENTS

2005/0129484 A1\* 6/2005 Huang ................ F16B 25/0047
411/389
2006/0104742 A1\* 5/2006 Fleming ................ F16B 5/0275
411/389

\* cited by examiner

ANTI-VIBRATION FASTENER

BACKGROUND

1. Field

The present general inventive concept relates generally to a fastener, and particularly, to an anti-vibration fastener.

2. Description of the Related Art

A fastener is a mechanical device typically used to join two or more objects together. Nuts and bolts of all sizes, design, and material are manufactured by industries every day. The main purpose of a fastener is to attach one object to another. They are made according to engineering specifications and are used in various manufacturing industries, including consumer products, marine products, aerospace products, automotive products, and light products. In most applications, fasteners are required to be constructed from durable material. Furthermore, fasteners can function in very high or low temperatures and can dampen vibration.

Currently, in some products, a standard wrench is used to tighten the fastener. In other products, a torque wrench is used on the fastener. Yet, another commonly used method is to lock wire the nut or use a tab washer in order to maintain the clamping force of the fastener.

Vibration loosening is an important concern when using any fastener. In particular, vibration that causes sliding of the nut and/or the bolt relative to a joint, can result in motion between the threads and reduce the clamp force provided by the nut and/or bolt. Furthermore, the sliding in the joint can result in further stress on the bolt due to bending loads and even joint failure.

One approach to reducing vibration loosening is using an adhesive applied in the threads of the nut and/or the bolt. The main purpose of the adhesive is to increase the friction and/or prevent the nut and/or the bolt from sliding.

The Nord-Lock Company has created the Nord-Lock wedge washer, which is very effective against vibration. However, a washer is only one type of fastener and there are many objects that have different ways to be joined.

Therefore, there is a need for other types of fasteners that dampens the force of vibration.

SUMMARY

The present general inventive concept provides an anti-vibration fastener.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an anti-vibration fastener, including a square flange bolt to affix a first object to a second object, the square flange bolt including a first threaded portion disposed at a front end of the square flange bolt, and a second threaded portion disposed at a rear end of the square flange bolt having a diameter smaller than a diameter of the first threaded portion, and a forward nut to encapsulate at least a portion of the square flange bolt such that the first object and the second object are disposed between the forward nut and the front end of the square flange bolt, and an aft nut to encapsulate at least a portion of the square flange bolt and the forward nut.

The first threaded portion may include a plurality of external threads oriented in a first direction and the second threaded portion may include a plurality of external threads oriented in the first direction.

The forward nut may further include a front portion, including a front aperture disposed at substantially center portion of the front portion to receive at least a portion of the first threaded portion therein, the front aperture having a diameter substantially similar to the diameter of the first threaded portion, and a plurality of internal threads disposed within an inner surface of the front aperture oriented in the first direction to correspond to and interweave with the plurality of external threads of the first threaded portion.

The forward nut may further include a stub portion connected to the front portion of the forward nut, the stub portion including a rear aperture disposed at a substantially center portion of the stub portion to receive at least a portion of the second threaded portion, the rear aperture having a diameter substantially similar to the diameter of the second threaded portion, and a plurality of internal threads disposed within the an inner surface of the rear aperture oriented in the first direction to correspond to and interweave with the plurality of external threads of the second threaded portion.

The stub portion may further include a plurality of external threads disposed on an external surface of the stub portion of the forward nut.

The aft nut may further include a front portion, including a front aperture disposed at a portion of a center of the front portion to receive at least a portion of the stub portion of the forward nut and having a diameter substantially similar to the diameter of the stub portion of the forward nut, and a plurality of internal threads disposed within the front aperture oriented in the first direction to interweave with the plurality of external threads disposed on the stub portion of the forward nut.

The aft nut may further include a stub portion, including a rear aperture disposed at a portion of a center of the stub portion to receive at least a portion of the third section and having a diameter substantially similar to the diameter of the third section, and a plurality of internal threads disposed within the rear aperture oriented in the at least one direction to interweave with the plurality of external threads on the third section.

The square flange bolt may further include a non-threaded portion disposed between the first threaded portion and the second threaded portion to separate the first threaded portion from the second threaded portion.

The first threaded portion may include a plurality of external threads oriented in a first direction, and the second threaded portion may include a plurality of external threads oriented in a second direction.

The forward nut may further include a front portion, including a front aperture disposed at substantially center portion of the front portion to receive at least a portion of the first threaded portion therein, the front aperture having a diameter substantially similar to the diameter of the first threaded portion, and a plurality of internal threads disposed within an inner surface of the front aperture oriented in the first direction to correspond to and interweave with the plurality of external threads of the first threaded portion.

The forward nut may further include a stub portion connected to the front portion of the forward nut, the stub portion including a rear aperture disposed at a substantially center portion of the stub portion to receive at least a portion of the second threaded portion, the rear aperture having a diameter larger than the diameter of the second threaded portion, and a non-threaded inner surface disposed within the rear aperture to receive the plurality of external threads of the second threaded portion.

The stub portion may further include a plurality of external threads disposed on an external surface of the stub portion of the forward nut.

The aft nut may further include a front portion, including a front aperture disposed at a portion of a center of the front portion to receive at least a portion of the stub portion of the forward nut and having a diameter substantially similar to the diameter of the stub portion of the forward nut, and a plurality of internal threads disposed within the front aperture oriented in the first direction to interweave with the plurality of external threads disposed on the stub portion of the forward nut.

The aft nut may further include a stub portion, including a rear aperture disposed at a portion of a center of the stub portion to receive at least a portion of the second threaded portion and having a diameter substantially similar to the diameter of the second threaded portion, and a plurality of internal threads disposed within the rear aperture oriented in the at least one direction to interweave with the plurality of external threads on the second threaded portion.

The foregoing and/or other features and utilities of the present general inventive concept may also be achieved by providing an anti-vibration fastener, including a square bolt to affix an object to a wall, the square bolt including a first threaded portion having a first diameter, the first threaded portion being disposed at a front end of the square bolt, and a second threaded portion having a second diameter, the second threaded portion being disposed at a rear end of the square bolt to be at least partially inserted into the wall, a forward nut to encapsulate at least a portion of the square bolt such that the first object is disposed between the forward nut and the wall, and an aft nut to encapsulate at least a portion of the square bolt and the forward nut.

The second diameter may be larger than the first diameter.

The second diameter may be smaller than the first diameter.

The square flange bolt may further include a non-threaded portion disposed between the first threaded portion and the second threaded portion to separate the first threaded portion from the second threaded portion.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined hi commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
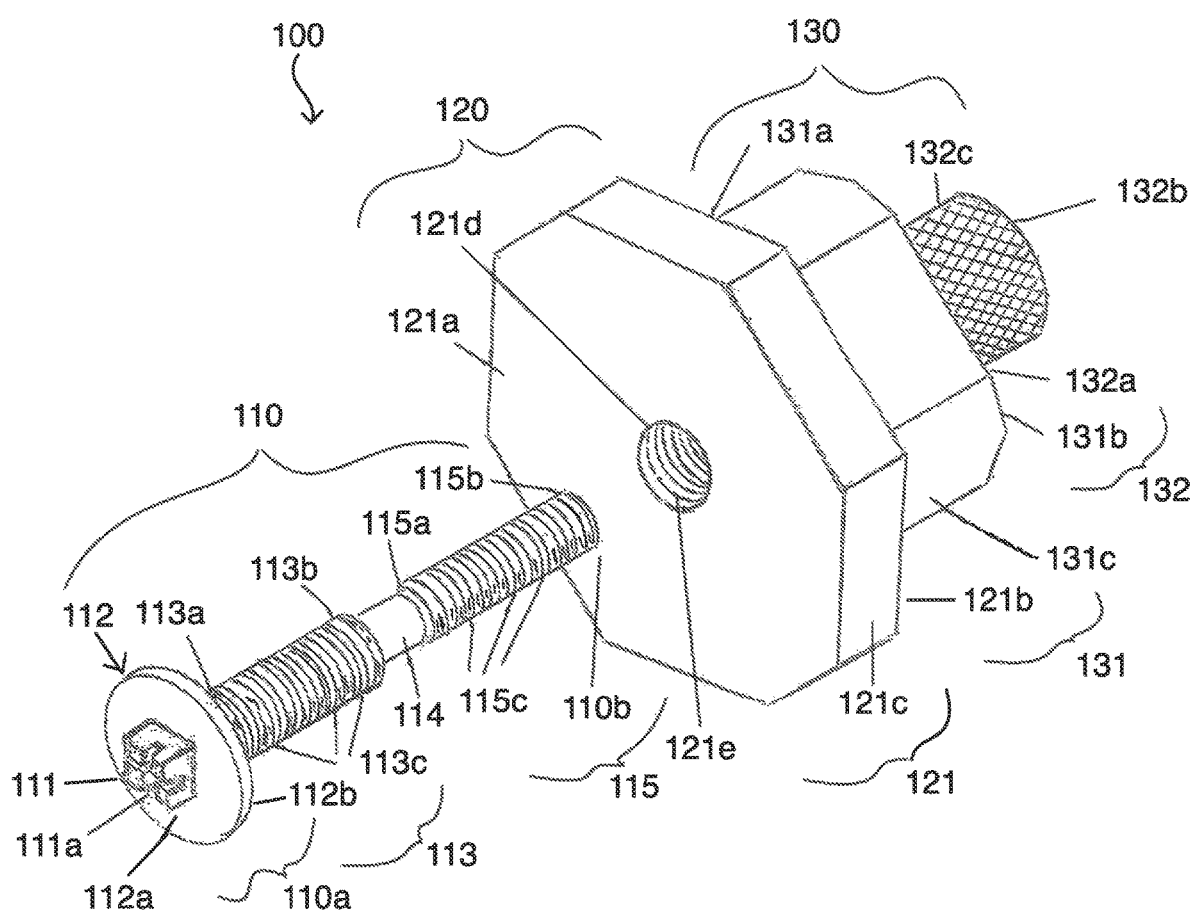
FIG. 1 illustrates an exploded view of an anti-vibration fastener, according to an exemplary embodiment of the present general inventive concept.

FIG. 1 illustrates an exploded view of an anti-vibration fastener 100, according to an exemplary embodiment of the present general inventive concept.

Figure 2A:
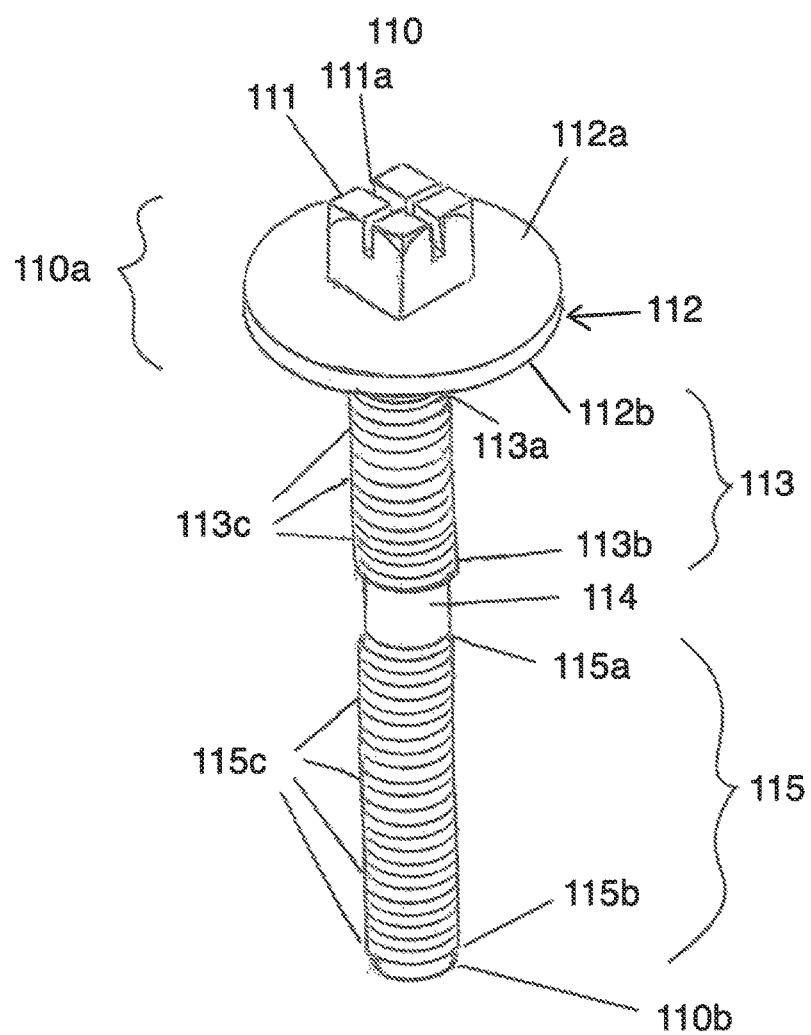
FIG. 2A illustrates an isometric view of a square flange bolt, according to an exemplary embodiment of the present general inventive concept.

FIG. 2A illustrates an isometric view of a square flange bolt 110, according to an exemplary embodiment of the present general inventive concept.

Figure 2B:
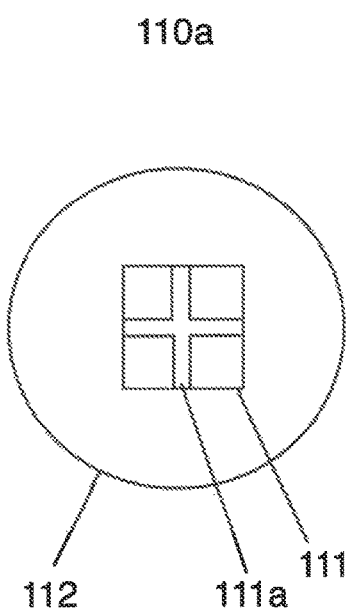
FIG. 2B illustrates a top view of a front end of the square flange bolt, according to an exemplary embodiment of the present general inventive concept.

FIG. 2B illustrates a top view of a front end 110a of the square flange bolt 110, according to an exemplary embodiment of the present general inventive concept.

The anti-vibration fastener 100 may be constructed from at least one of metal, plastic, wood, and rubber, etc., but is not limited thereto.

The anti-vibration fastener 100 may include a square flange bolt 110, a forward nut 120, and an aft nut 130, but is not limited thereto.

Although, the square flange bolt 110 is illustrated to be a bolt type fastener, the square flange bolt 110 may be at least one of a nail, a screw, a pin, a peg, a rivet, a threaded insert, and a threaded rod, etc., but is not limited thereto.

The square flange bolt 110 may include a front end 110a, a rear end 110b, a head 111, a flange 112, a first section 113, a second section 114, and a third section 115, but is not limited thereto.

Referring to FIGS. 1 through 2B, the head 111 is illustrated to have a rectangular prism shape. However, the head 111 may be rectangular, circular, pentagonal, hexagonal, octagonal, or any other shape known to one of ordinary skill in the art, but is not limited thereto.

The head 111 may include at least one screwdriver-receiving groove 111a, but is not limited thereto.

The head 111 may be of any predetermined size to include the at least one screwdriver-receiving groove 111a of any predetermined size. The at least one screwdriver-receiving groove 111a may receive at least one of a Phillips-head screwdriver and a flat-head screwdriver, etc., but is not limited thereto. Furthermore, the head 111 may receive at least one of a socket wrench and a torque wrench, etc., but is not limited thereto.

The flange 112 may include a front surface 112a and a bearing surface 112b, but is not limited thereto.

The first section 113 may include a first end 113a, a second end 113b, and a plurality of external threads 113c, but is not limited thereto.

The third section 115 may include a first end 115a, a second end 115b, and a plurality of external threads 115c, but is not limited thereto.

Referring to FIGS. 1 through 2A, the first section 113 may be substantially larger in diameter with respect to the diameter of the second section 114 and the diameter of the third section 115. The plurality of external threads 113c may be disposed on at least a portion of the first section 113. The plurality of external threads 113c may be oriented in a first direction (e.g., counterclockwise), but are not limited thereto. Alternatively, the plurality of external threads 113c may be oriented in a second direction (e.g., clockwise), but are not limited thereto. The second section 114 may include a substantially smooth surface, but is not limited thereto. The plurality of external threads 115c may be disposed on at least a portion of the third section 115. The plurality of external threads 115c may be oriented in the first direction, but are not limited thereto. Alternatively, the plurality of external threads 115c may be oriented in the second direction, but are not limited thereto. The rear end 110b may be shaped by at least one of tapered, pointed, flat, etc., but is not limited thereto.

Alternatively, the first section 113 may also be referred to as the first threaded portion 113, and the third section 115 may also be referred to as the second threaded portion 115, for at least the reason that the first section 113 includes the plurality of external threads 113c, and the third section 115 includes the plurality of external threads 115c.

Alternatively, the second section 114 may also be referred to as a non-threaded portion 114, for at least the reason that the second section 114 does not include any threading. Also, the second section 114 may be an optional portion of the square flange bolt 110, and may be excluded from the square flange bolt 110 based on a manufacturer's preference.

Figure 3:
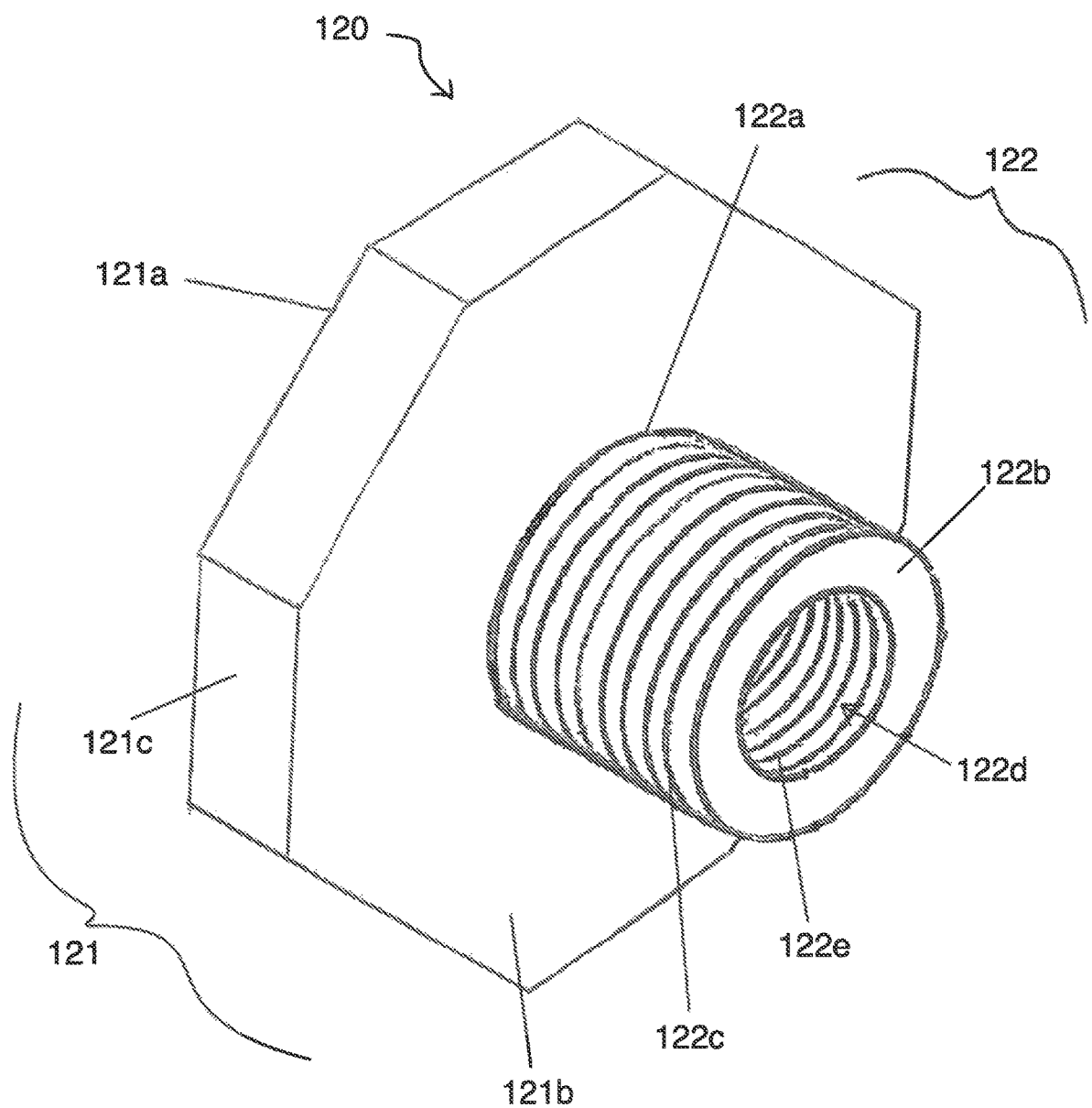
FIG. 3 illustrates an isometric bottom view of a forward nut, according to an exemplary embodiment of the present general inventive concept.

FIG. 3 illustrates an isometric bottom view of a forward nut 120, according to an exemplary embodiment of the present general inventive concept.

Referring to FIGS. 1 and 3, the forward nut 120 may include a front portion 121 and a stub portion 122, but is not limited thereto.

Referring to FIGS. 1 and 3, the front portion 121 is illustrated to have an octagonal shape. However, the front portion 121 may be rectangular prism, rectangular, circular, pentagonal, hexagonal, or any other shape known to one of ordinary skill in the art, but is not limited thereto.

Referring to FIG. 1, the front portion 121 may include a front surface 121a, a rear surface 121b, an octagonal surface 121c, a front aperture 121d, and a plurality of internal threads 121e, but is not limited thereto.

Referring to FIG. 3, the stub portion 122 may include a first end 122a, a second end 122b, a plurality of external threads 122c, a rear aperture 122d, and a plurality of internal threads 122e, but is not limited thereto.

Referring to FIGS. 1 and 3, the front aperture 121d may be disposed at a portion of a center of the front portion 121. Furthermore, the front aperture section 121d may be substantially larger in diameter with respect to the diameter of the rear aperture 122d and may extend across at least a portion of a length of the front portion 121, beginning from the front surface 121a and terminating at a juncture of the rear surface 121b and the first end 122a. The rear aperture 122d may be disposed at a portion of a center of the stub portion 122. Additionally, the rear aperture 122d may extend across at least a portion of the length of the stub portion 122, beginning from the second end 122b and terminating at the juncture of the rear surface 121b and the first end 122a.

The plurality of internal threads 121e may be disposed within the front aperture 121d. The plurality of internal threads 121e may be oriented in the first direction, but are not limited thereto. Alternatively, the plurality of internal threads 121e may be oriented in the second direction, but are not limited thereto. The plurality of external threads 122c may be disposed on at least a portion of the stub portion 122.

The plurality of external threads 122c may be oriented in the first direction, but are not limited thereto. Alternatively, the plurality of external threads 122c may be oriented in the second direction, but are not limited thereto. The plurality of internal threads 122e may be disposed within the rear aperture 122d. The plurality of internal threads 122e may be oriented in the first direction, but are not limited thereto. Alternatively, the plurality of internal threads 122e may be oriented in the second direction, but are not limited thereto.

Figure 4:
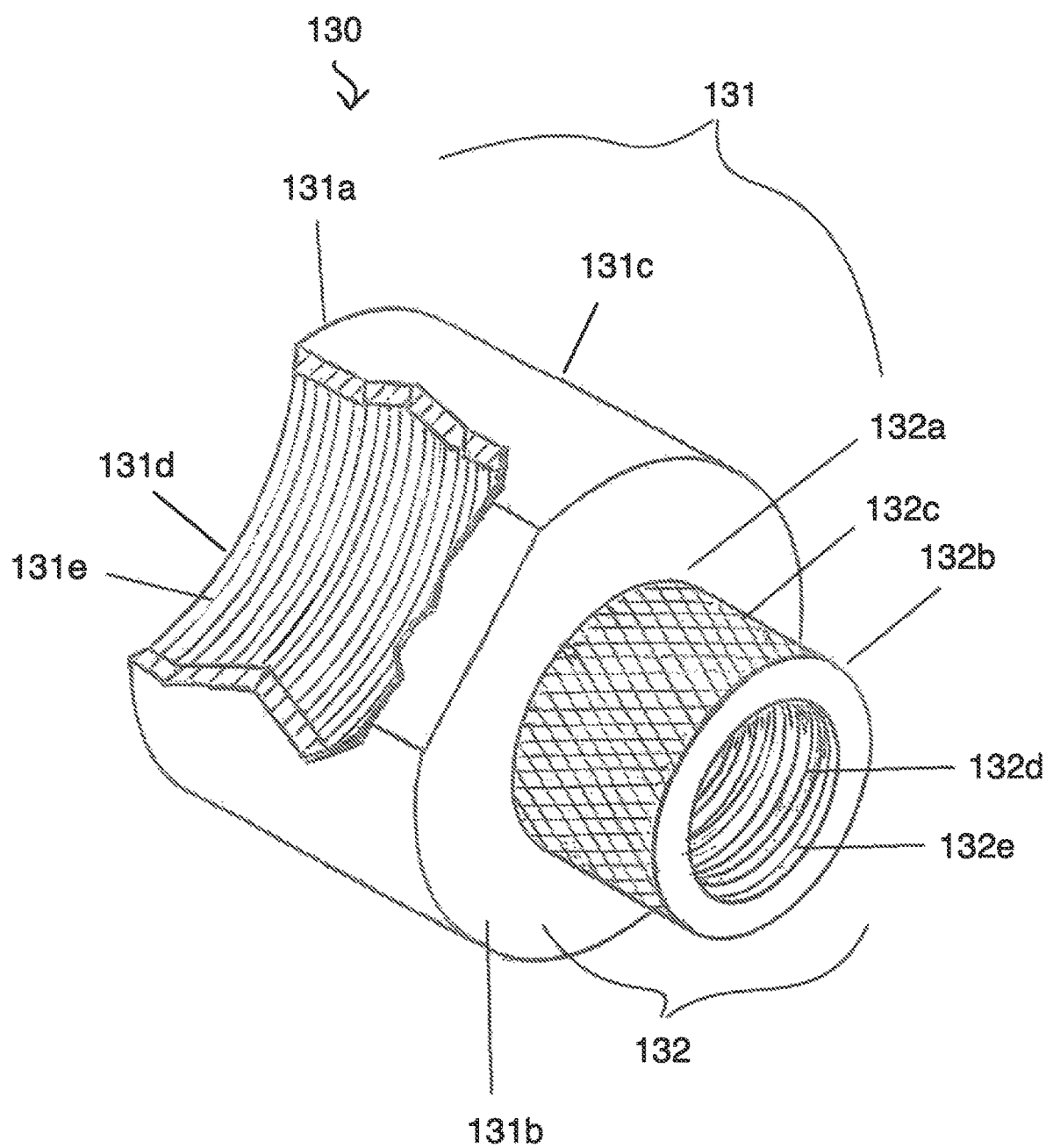
FIG. 4 illustrates an isometric bottom view of an aft nut including a partial interior view the aft nut, according to an exemplary embodiment of the present general inventive concept.

FIG. 4 illustrates an isometric bottom view of an aft nut 130 including an interior view the aft nut 130, according to an exemplary embodiment of the present general inventive concept.

Referring to FIGS. 1 and 4, the aft nut 130 may include a front portion 131 and a stub portion 132, but is not limited thereto.

Referring to FIG. 4, the front portion 131 may include a front surface 131a, a rear surface 131b, a cylindrical surface 131c, a front aperture 131d, and a plurality of internal threads 131e, but is not limited thereto.

Referring to FIGS. 1 and 4, the cylindrical surface 131c is illustrated to have a cylindrical shape with two flat sides. However, the cylindrical surface 131c may be rectangular prism, rectangular, circular, pentagonal, hexagonal, or any other shape known to one of ordinary skill in the art, but is not limited thereto.

Referring to FIG. 4, the stub portion 132 may include a first end 132a, a second end 132b, a knurled surface 132c, a rear aperture 132d, and a plurality of internal threads 132e, but is not limited thereto.

Referring to FIG. 4, the front aperture 131d may be disposed at a portion of a center of the front portion 131. Furthermore, the front aperture section 131d may be substantially larger in diameter with respect to the diameter of the second rear aperture 132d and may extend across at least a portion of a length of the front portion 131, beginning from the front surface 131a and terminating at a juncture of the rear surface 131b and the first end 132a. The rear aperture 132d may be disposed at a portion of a center of the stub portion 132. Additionally, the rear aperture 132d may extend across at least a portion of the length of the stub portion 132, beginning from the second end 132b and terminating at the juncture of the rear surface 131b and the first end 132a.

The plurality of internal threads 131e may be disposed within the front aperture 131d. The plurality of internal threads 131e may be oriented in the first direction, but are not limited thereto. Alternatively, the plurality of internal threads 131e may be oriented in the second direction, but are not limited thereto. The knurled surface 132c may include a pattern of straight, angled, and/or crossed lines, but is not limited thereto. The knurled surface 132c may enable a user to grasp the stub portion 132, such that the user may rotate the aft nut 130. Specifically, the knurled surface 1320 may be a textured surface, which increases the friction between the user's fingers and the knurled surfaced 132c, such that the aft nut 130 may rotate in response to the user rotating the aft nut 130 in any direction. The plurality of internal threads 132e may be disposed within the rear aperture 132d. The plurality of internal threads 132e may be oriented in the first direction, but are not limited thereto. Alternatively, the plurality of internal threads 132e may be oriented in the second direction, but are not limited thereto.

Referring to FIGS. 3 through 4, although, the plurality of external threads 122c of the forward nut 120 is illustrated to be wider than the plurality of internal threads 131e of the aft nut 130, the plurality of external threads 122c are not to scale. Therefore, the plurality of external threads 122c of the forward nut 120 may be interwoven with the plurality of internal threads 131e of the aft nut 130.

Figure 5:
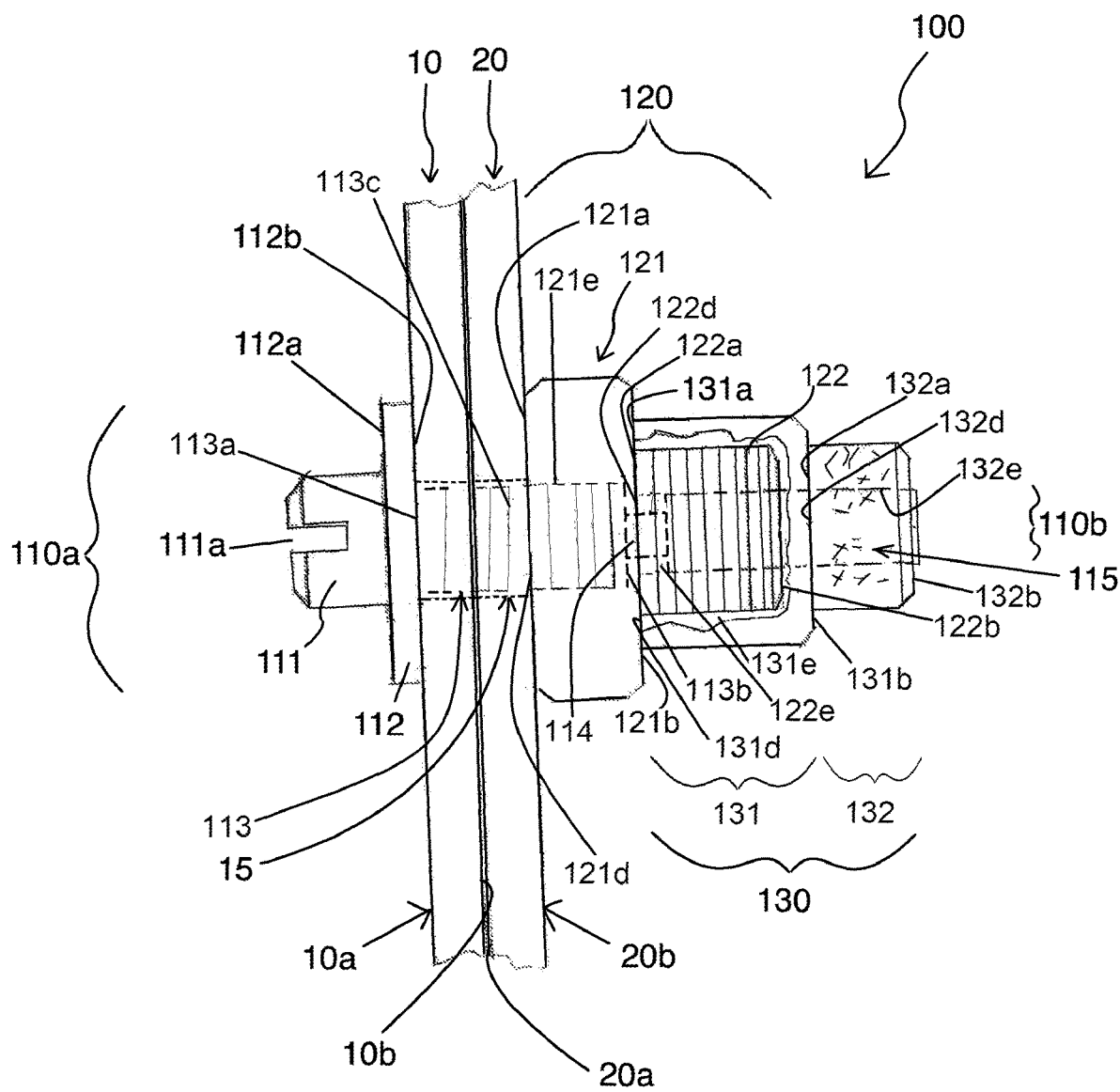
FIG. 5 illustrates a cutaway view of the anti-vibration fastener using the square flange bolt, according to an exemplary embodiment of the present general inventive concept.

FIG. 5 illustrates a cutaway view of the anti-vibration fastener 100 using the square flange bolt 110, according to an exemplary embodiment of the present general inventive concept.

Referring to FIG. 5, the anti-vibration fastener 100 may be used to affix and/or adhere a first object 10 to a second object 20. The first object 10 and the second object 20 may be arranged, such that at least a portion of a rear surface 10b of the first object 10 is in substantial contact with at least a portion of a front surface 20a of the second object 20. Subsequently, the square flange bolt 110 may be inserted, by the user, through a hole 15 in both the first object 10 and the second object 20 at a similar location. The user may grasp at least one of a portion of the front end 110a, a portion of the first section 113, a portion of the second section 114, and a portion of the third section 115 to apply a lateral force to the square flange bolt 110 into the hole 15. The third section 115 may enter the first object 10 and the second object 20 via the hole 15, followed by the second section 114, and the first section 113. Moreover, the movement of the square flange bolt 110 may terminate in response to the bearing surface 112b contacting a front surface 10a of the first object 10.

At least a portion of the third section 115, a portion of the second section 114, and a portion of the first section 113 may extend laterally away from a rear surface 20b of the second object 20. The user may affix and/or adhere the forward nut 120 to the square flange bolt 110 to secure the first object 10 to the second object 20. The user may grasp the forward nut 120 via at least a portion of the front portion 121 and/or at least a portion of the stub portion 122. The user may orient the forward nut 120, such that the front surface 121a and the front aperture 121d are facing the rear surface 20b of the second object 20. Subsequently, the front aperture 121d may be moved laterally toward the rear surface 20b of the second object 20 and maneuvered to encapsulate at least a portion of the square flange bolt 110. In other words, the front aperture 121d may be positioned and moved by the user, such that as the user may move the forward nut 120 towards the rear surface 20b of the second object 20. As such, the front aperture 121d may receive the third section 115, first, followed by the second section 114, and at least a portion of the first section 113.

The rear aperture 122d may have substantially the same diameter as the diameter of the third section 115. As such, at least a portion of the rear aperture 122d may no longer be moved laterally over the third section 115. Moreover, upon contact of the rear aperture 122d with the second end 115b of the third section 115, the user may rotate the forward nut 120 in the first direction, such that the plurality of internal threads 122e are interwoven corresponding to the plurality of external threads 115c.

The front aperture 121d may have substantially the same diameter as the diameter of the first section 113. As such, the front aperture 121d may no longer be moved laterally over the first section 113. Moreover, upon contact of the front aperture 121d with the second end 113b of the first section 113, the user may rotate the forward nut 120 in the first direction, such that the plurality of internal threads 121e are interwoven corresponding to the plurality of external threads 113c. The forward nut 120 may be rotated in the first direction until the front surface 121a has made substantial contact with the rear surface 20b of the second object 20 and there is substantial resistance to further rotation thereof. Thus, the forward nut 120 and the square flange bolt 110 may be considered interlocked.

The combination of the square flange bolt 110 and the forward nut 120 may extend laterally away from the rear surface 20b of the second object 20. The user may affix and/or adhere the aft nut 130 to the forward nut 120. The user may grasp the aft nut 130 via at least a portion of the front portion 131 and/or at least a portion of the stub portion 132. Specifically, the user may grasp the knurled surface 132c via at least a portion of the stub portion 132. The user may orient the aft nut 130, such that the front surface 131a and the front aperture 131d are facing the rear surface 121b of the forward nut 120. Subsequently, the front aperture 131d may be moved laterally toward the rear surface 121b of the forward nut 120 and maneuvered to encapsulate at least a portion of the square flange bolt 110 and the forward nut 120. In other words, the front aperture 131d may be positioned and moved by the user, such that as the user may move the aft nut 130 towards the rear surface 121b of the forward nut 120. As such, the front aperture 131d may receive the third section 115, first, followed by at least a portion of the second section 114.

The rear aperture 132d may have substantially the same diameter as the diameter of the third section 115. As such, at least a portion of the rear aperture 131d may no longer be moved laterally over the third section 115. Moreover, upon contact of the rear aperture 132d with the second end 115b of the third section 115, the user may rotate the aft nut 130 in the first direction, such that the plurality of internal threads 132e are interwoven corresponding to the plurality of external threads 115c.

The front aperture 131d may have substantially the same diameter as the diameter of the stub portion 122 of the forward nut 120. As such, the front aperture 131d may no longer be moved laterally over the stub portion 122. Moreover, upon contact of the front aperture 131d with the second end 122b of the stub portion 122, the user may rotate the aft nut 130 in the first direction such that the plurality of internal threads 131e are interwoven corresponding to the plurality of external threads 122c. The aft nut 130 may be rotated in the first direction until the front surface 131a has made substantial contact with the rear surface 121b of the forward nut 120 and there is substantial resistance to further rotation thereof. As such, the contact of the front surface 131a of the aft nut 130 and the rear surface 121b of the forward nut 120 may be near at least a portion of the second section 114 of the square flange bolt 110, such that it may be considered substantially at the center of the second section 114. Thus, the aft nut 130, the forward nut 120, and the square flange bolt 110 may be considered interlocked.

The interlocked arrangement of the forward nut 120 and the aft nut 130 may reduce vibration to a minimum. Specifically, the interwoven arrangement of the plurality of the internal threads 131e with the plurality of external threads 122c in the first direction may cancel any loosening motion of the forward nut 120 in the second direction. As such, the aft nut 130 may oppose any motion of the forward nut 120 rotating in the second direction.

The application of the anti-vibration fastener 100 to any article and/or process of manufacture and/or assembly in relevant industries may significantly improve the article and/or process. The specific combination of the square flange bolt 110, the difference in diameter of the first section 113 with respect to the third section 115, the forward nut 120, the difference in diameter of the front aperture 121d with respect to the rear aperture 122d, the aft nut 130, the difference in diameter of the front aperture 131d with respect to the rear aperture 132d, and the interwoven arrangement of the plurality of external threads 122c and the plurality of internal threads 131e may create a stronger bond than the conventional bolt and nut. As such, the anti-vibration fastener 100 may withstand any vibration force, including at least one of wind, seismic activity, volcanic eruption, etc., but is not limited thereto.

Figure 6:
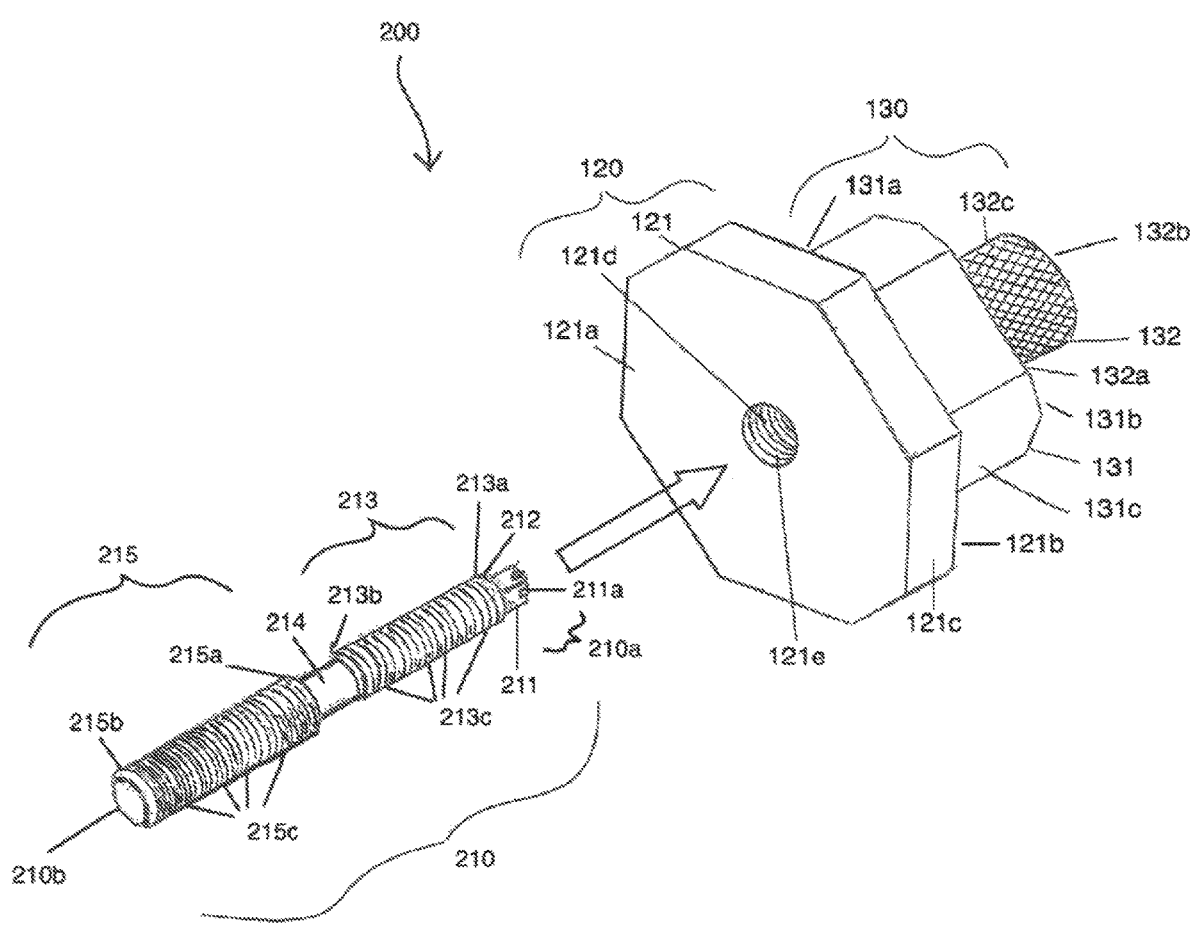
FIG. 6 illustrates an exploded view of an anti-vibration fastener, according to another exemplary embodiment of the present general inventive concept.
Figure 7A:
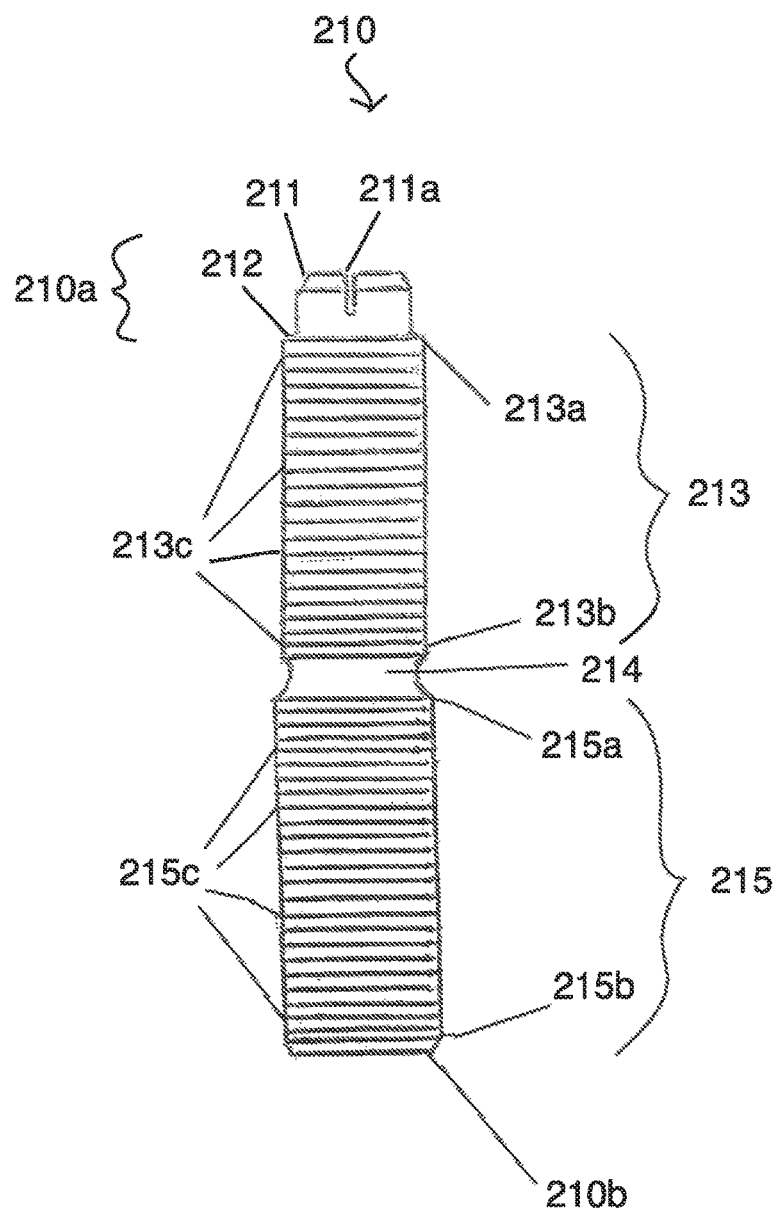
FIG. 7A illustrates side view of a square bolt, according to another exemplary embodiment of the present general inventive concept.
Figure 7B:
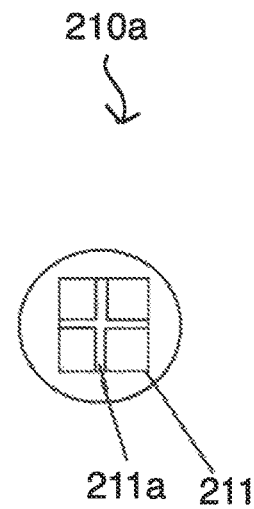
FIG. 7B illustrates a top view of a front end of the square bolt, according to another exemplary embodiment of the present general inventive concept.

FIG. 6 illustrates an exploded view of an anti-vibration fastener 200, according to another exemplary embodiment of the present general inventive concept;

FIG. 7A illustrates an isometric view of a square bolt 210, according to another exemplary embodiment of the present general inventive concept;

FIG. 7B illustrates a top view of a front end 210a of the square bolt 210, according to another exemplary embodiment of the present general inventive concept.

The anti-vibration fastener 200 may be constructed from at least one of metal, plastic, wood, and rubber, etc., but is not limited thereto.

The anti-vibration fastener 200 may include a square bolt 210, a forward nut 120, and an aft nut 130, but is not limited thereto.

Although, the square bolt 210 is illustrated to be a bolt type fastener, the square bolt 210 may be at least one of a nail, a screw, a pin, a peg, a rivet, a threaded insert, and a threaded rod, etc., but is not limited thereto.

The square flange bolt 210 may include a front end 210a, a rear end 210b, a head 211, an intermediary surface 212, a first section 213, a second section 214, and a third section 215 but is not limited thereto.

Referring to FIGS. 6 through 7B, the head 211 is illustrated to have a rectangular prism shape. However, the head 211 may be rectangular, circular, pentagonal, hexagonal, octagonal, or any other shape known to one of ordinary skill in the art, but is not limited thereto.

The head 211 may include at least one screwdriver-receiving groove 211a, but is not limited thereto.

The head 211 may be of any predetermined size to include the at least one screwdriver-receiving groove 211a of any predetermined size. The at least one screwdriver-receiving groove 211a may receive at least one of a Phillips-head screwdriver and a flat-head screwdriver, etc., but is not limited thereto. Furthermore, the head 211 may receive at least one of a socket wrench and a torque wrench, etc., but is not limited thereto.

The first section 213 may include a first end 213a, a second end 213b, and a plurality of external threads 213c, but is not limited thereto.

The third section 215 may include a first end 215a, a second end 215b, and a plurality of external threads 215c, but is not limited thereto.

The first section 213 may be substantially larger in diameter with respect to the diameter of the second section 214 and the diameter of the third section 215. The plurality of external threads 213c may be disposed on at least a portion of the first section 213. The plurality of external threads 213c may be oriented in a first direction (e.g., counterclockwise), but are not limited thereto. Alternatively, the plurality of external threads 213c may be oriented in a second direction (e.g., clockwise), but are not limited thereto. The second section 214 may be a substantially smooth surface, but is not limited thereto. The plurality of external threads 215c may be disposed on at least a portion of the third section 215. The plurality of external threads 215c may be oriented in the first direction, but are not limited thereto. Alternatively, the plurality of external threads 215c may be oriented in the second direction, but are not limited thereto. The rear end 210b may be shaped by at least one of tapered, pointed, flat, etc., but is not limited thereto.

Alternatively, the first section 213 may also be referred to as the first threaded portion 213, and the third section 215 may also be referred to as the second threaded portion 215, for at least the reason that the first section 213 includes the plurality of external threads 213c, and the third section 215 includes the plurality of external threads 215c.

Alternatively, the second section 214 may also be referred to as a none threaded portion 214, for at least the reason that the second section 214 does not include any threading. Also, the second section 214 may be an optional portion of the square flange bolt 210, and may be excluded from the square flange bolt 210 based on a manufacturer's preference.

Figure 8:
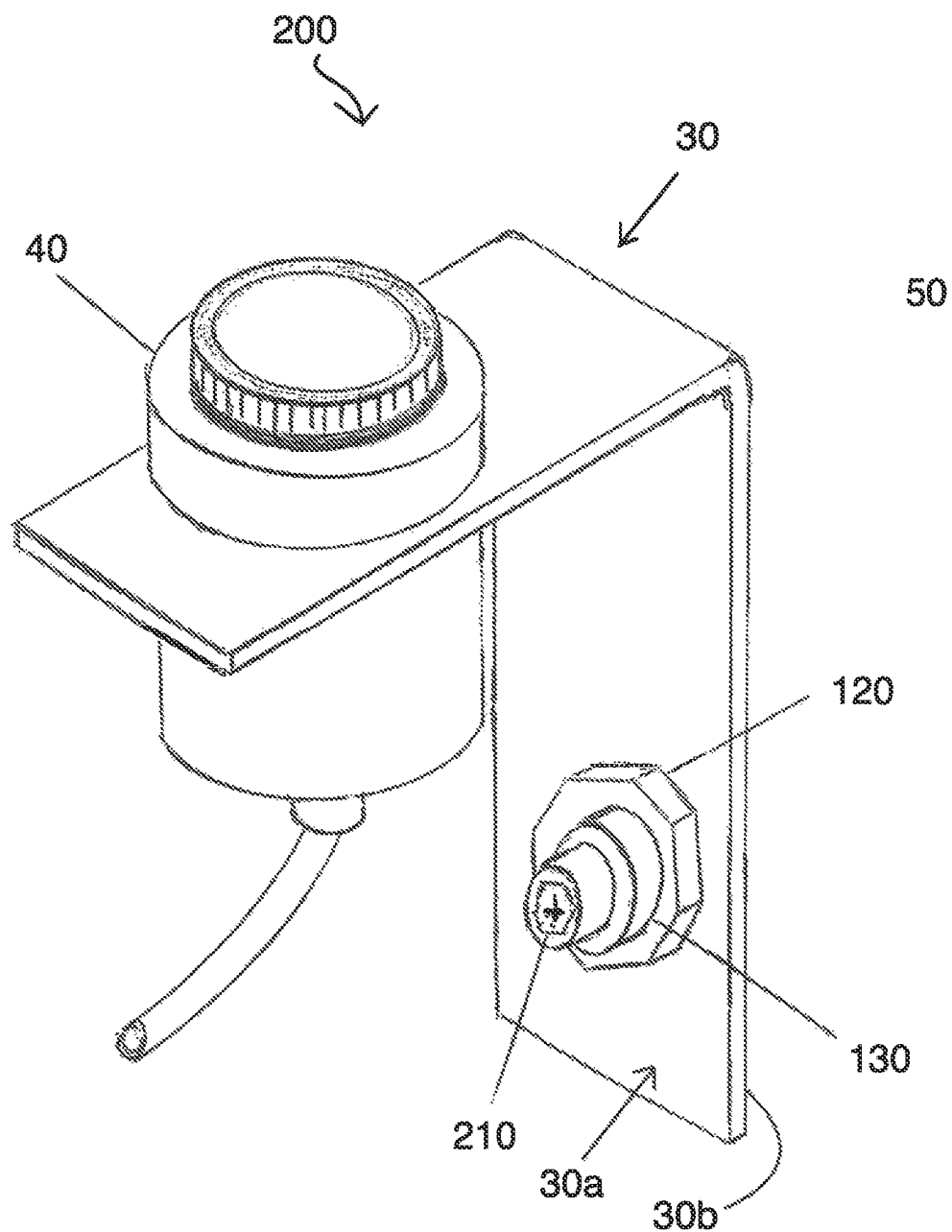
FIG. 8 illustrates an isometric rear end view of the anti-vibration fastener using the square bolt affixed to a wall, according to another exemplary embodiment of the present general inventive concept.

FIG. 8 illustrates an isometric rear end view of the anti-vibration fastener 200 using the square bolt 210 affixed to a wall, according to another exemplary embodiment of the present general inventive concept.

Referring to FIGS. 1 and 8, the user may affix and/or adhere the forward nut 120 to the square bolt 210. The user may grasp at least one of a portion of the front end 210a, a portion of the first section 213, a portion of the second section 214, and a portion of the third section 215 to apply a lateral force to the square bolt 210 into the forward nut 120 via the front aperture 121d. The user may grasp the forward nut 120 via at least a portion of the front portion 121 and/or at least a portion of the stub portion 122. The user may orient the forward nut 120, such that the front surface 121a and the front aperture 121d are facing the head 211. Subsequently, the front aperture 121d may be moved laterally toward the head 211 and maneuvered to encapsulate at least a portion of the square bolt 210. As such, the front aperture 121d will first receive the first section 213, followed by the second section 214, and at least a portion of the third section 215.

At least a portion of the third section 215, a portion of the second section 214, and a portion of the first section 213 may extend laterally away from a front surface 30a of the first object 30. The user may affix and/or adhere the forward nut 120 to the square bolt 210. The user may grasp the forward nut 120 via at least a portion of the front portion 121 and/or at least a portion of the stub portion 122.

The rear aperture 122d may have substantially the same diameter as the diameter of the first section 213. As such, at least a portion of the rear aperture 122d may no longer be moved laterally over the first section 213. Moreover, upon contact of the rear aperture 122d with the first end 213a of the first section 213, the user may rotate the forward nut 120 in the first direction, such that the plurality of internal threads 122e are interwoven corresponding to the plurality of external threads 213c.

The front aperture 121d may have substantially the same diameter as the diameter of the third section 215. As such, the front aperture 121d may no longer be moved laterally over the first section 215. Moreover, upon contact of the front aperture 121d with the first end 215a of the third section 215, the user may rotate the forward nut 120 in the first direction such that the plurality of internal threads 121e are interwoven with the plurality of external threads 215c. The forward nut 120 may be rotated in the first direction until the square bolt 210 protrudes from the second end 122b and/or as desired by the user. Thus, the forward nut 120 and the square bolt 210 may be considered interlocked.

The user may affix and/or adhere the aft nut 130 to the combination of the square bolt 210 and the forward nut 120. The user may grasp the aft nut 130 via at least a portion of the front portion 131 and/or at least a portion of the stub portion 132. Specifically, the user may grasp the knurled surface 132c via at least a portion of the stub portion 132. The user may orient the aft nut 130, such that the front surface 131a and the front aperture 131d are facing the rear surface 121b of the forward nut 120. Subsequently, the front aperture 131d may be moved laterally toward the rear surface 121b of the forward nut 120 and maneuvered to encapsulate at least a portion of the square bolt 210 and the forward nut 120. In other words, the front aperture 131d may be positioned and moved by the user, such that as the user may move the aft nut 130 towards the rear surface 121b of the forward nut 120. As such, the front aperture 131d may receive the first section 213, first, followed by at least a portion of the second section 214.

The rear aperture 132d may have substantially the same diameter as the diameter of the first section 213. As such, at least a portion of the rear aperture 131d may no longer be moved laterally over the first section 213. Moreover, upon contact of the rear aperture 132d with the first end 213a of the first section 213, the user may rotate the aft nut 130 in the first direction, such that the plurality of internal threads 132e are interwoven corresponding to the plurality of external threads 213c.

The front aperture 131d may have substantially the same diameter as the diameter of the stub portion 122 of the forward nut 120. As such, the front aperture 131d may no longer be moved laterally over the stub portion 122. Moreover, upon contact of the front aperture 131d with the second end 122b of the stub portion 122, the user may rotate the aft nut 130 in the first direction such that the plurality of internal threads 131e are interwoven corresponding to the plurality of external threads 122c. The aft nut 130 may be rotated in the first direction until the front surface 131a has made substantial contact with the rear surface 121b of the forward nut 120 and there is substantial resistance to further rotation thereof. As such, the contact of the front surface 131a of the aft nut 130 and the rear surface 121b of the forward nut 120 may be near at least a portion of the second section 214 of the square bolt 210, such that it may be considered substantially at the center of the second section 214. Thus, the aft nut 130, the forward nut 120, and the square bolt 210 may be considered interlocked.

Referring to FIG. 8, the user may orient the anti-vibration fastener 200 toward the front surface 30a of the first object 30 disposed against the wall 50. More specifically, the forward nut 120 and at least a portion of the third section 215 of the square bolt 210 protruding from the front aperture 121d may be oriented to face the first object 30, such that the front surface 121a, the front aperture 121d, and the rear end 210b are facing the front surface 30a of the first object 30. Subsequently, the anti-vibration fastener 200 may be moved laterally toward the front surface 30a of the first object 30. In other words, the front aperture 121d may be positioned and moved by the user, such that as the user may move the forward nut 120 towards the front surface 30a of the first object 30.

The user may affix and/or adhere the first object 30 to the wall 50 by applying a lateral force of the combination of the square bolt 210, the forward nut 120, and the aft nut 130 through the wall 50.

The interlocked arrangement of the forward nut 120 and the aft nut 130 may reduce vibration to a minimum. Specifically, the interwoven arrangement of the plurality of the internal threads 131e with the plurality of external threads 122c in the first direction may cancel any loosening motion of the forward nut 120 in the second direction. As such, the aft nut 130 may oppose any motion of the forward nut 120 rotating in the second direction.

The application of the anti-vibration fastener 200 to any article and/or process of manufacture and/or assembly in relevant industries may significantly improve the article and/or process. The specific combination of the square bolt 210, the difference in diameter of the first section 213 with respect to the third section 215, the forward nut 120, the difference in diameter of the front aperture 121d with respect to the rear aperture 122d, the aft nut 130, the difference in diameter of the front aperture 131d with respect to the rear aperture 132d, and the interwoven arrangement of the plurality of external threads 122c and the plurality of internal threads 132e may create a stronger bond than the conventional bolt and nut. As such, the anti-vibration fastener 200 may withstand any vibration force, including at least one of wind, seismic activity, volcanic eruption, etc., but is not limited thereto.

Figure 9:
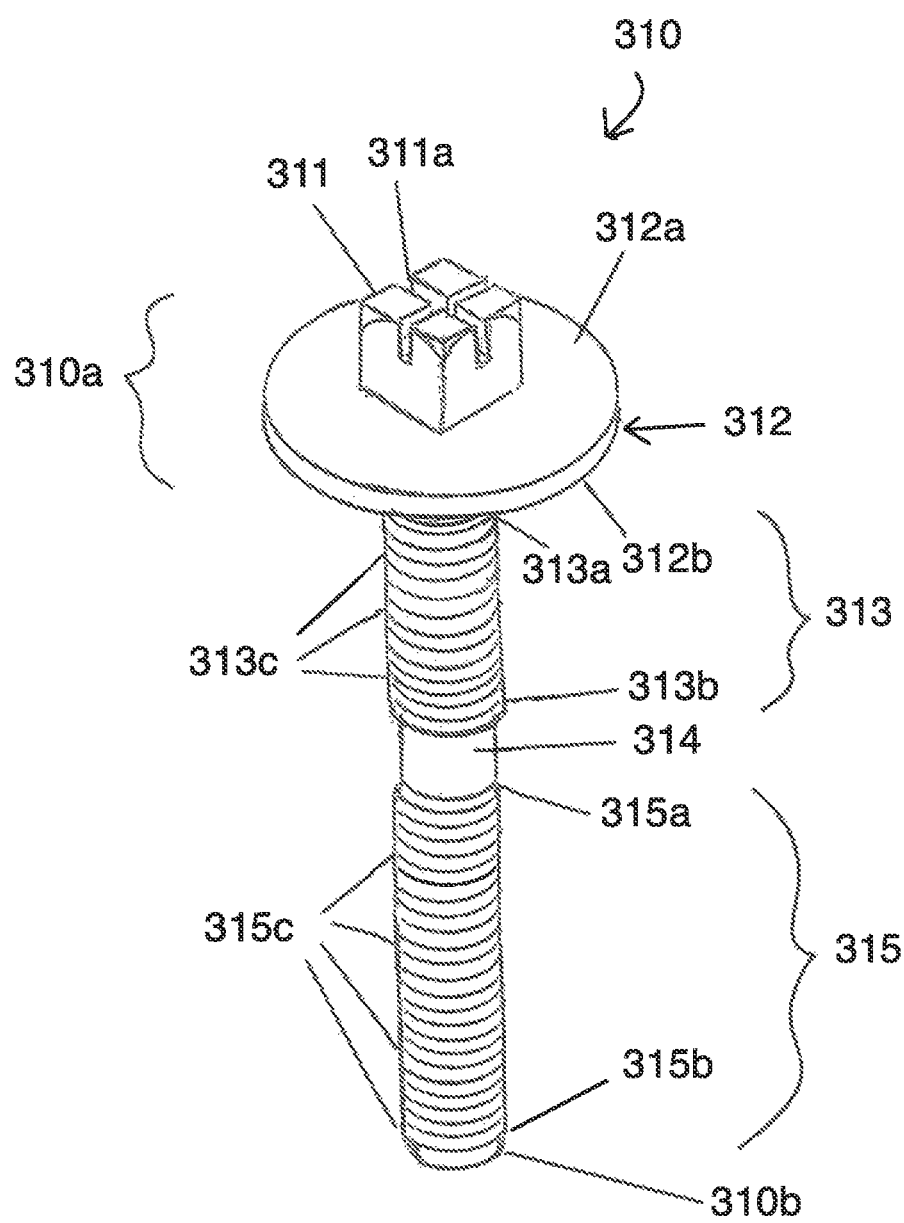
FIG. 9 illustrates an isometric view of a square flange bolt, according to another exemplary embodiment of the present general inventive concept.

FIG. 9 illustrates an isometric view of a square flange bolt 310, according to another exemplary embodiment of the present general inventive concept.

Although, the square flange bolt 310 is illustrated to be a bolt type fastener, the square flange bolt 310 may be at least one of a nail, a screw, a pin, a peg, a rivet, a threaded insert, and a threaded rod, etc., but is not limited thereto.

The square flange bolt 310 may include a front end 310a, a rear end 310b, a head 311, a flange 312, a first section 313, a second section 314, and a third section 315, but is not limited thereto.

Referring to AG. 9, the head 311 is illustrated to have a rectangular prism shape. However, the head 311 may be rectangular, circular, pentagonal, hexagonal, octagonal, or any other shape known to one of ordinary skill in the art, but is not limited thereto.

The head 311 may include at least one screwdriver-receiving groove 311a, but is not limited thereto.

The head 311 may be of any predetermined size to include the at least one screwdriver-receiving groove 311a of any predetermined size. The at least one screwdriver-receiving groove 311a may receive at least one of a Phillips-head screwdriver and a flat-head screwdriver, etc., but is not limited thereto. Furthermore, the head 311 may receive at least one of a socket wrench and a torque wrench, etc., but is not limited thereto.

The flange 312 may include a front surface 312a and a bearing surface 312h, but is not limited thereto.

The first section 313 may include a first end 313a, a second end 313b, and a plurality of external threads 313c, but is not limited thereto.

The third section 315 may include a first end 315a, a second end 315b, and a plurality of external threads 315c, but is not limited thereto.

Referring to FIG. 9, the first section 313 may be substantially larger in diameter with respect to the diameter of the second section 314 and the diameter of the third section 315. The plurality of external threads 313c may be disposed on at least a portion of the first section 313. The plurality of external threads 313c may be oriented in a first direction (e.g., counterclockwise), but are not limited thereto. Alternatively, the plurality of external threads 313c may be oriented in a second direction (e.g., clockwise), but are not limited thereto. The second section 314 may include a substantially smooth surface, but is not limited thereto. The plurality of external threads 315c may be disposed on at least a portion of the third section 315. The plurality of external threads 315c may be oriented in the second direction, but are not limited thereto. Alternatively, the plurality of external threads 315c may be oriented in the first direction, but are not limited thereto. The rear end 310b may be shaped by at least one of tapered, pointed, flat, etc., but is not limited thereto.

Alternatively, the first section 313 may also be referred to as the first threaded portion 313, and the third section 315 may also be referred to as the second threaded portion 315, for at least the reason that the first section 313 includes the plurality of external threads 313c, and the third section 315 includes the plurality of external threads 315c.

Alternatively, the second section 314 may also be referred to as a non-threaded portion 314, for at least the reason that the second section 114 does not include any threading. Also, the second section 314 may be an optional portion of the square flange bolt 310, and may be excluded from the square flange bolt 310 based on a manufacturer's preference.

Figure 10A:
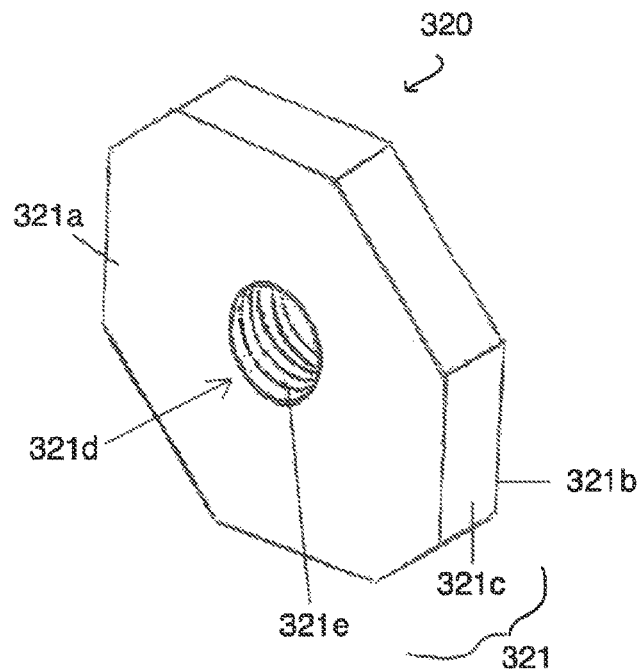
FIG. 10A a front view of a forward nut, according to another exemplary embodiment of the present general inventive concept.

FIG. 10A a front view of a forward nut 320, according to another exemplary embodiment of the present general inventive concept.

Figure 10B:
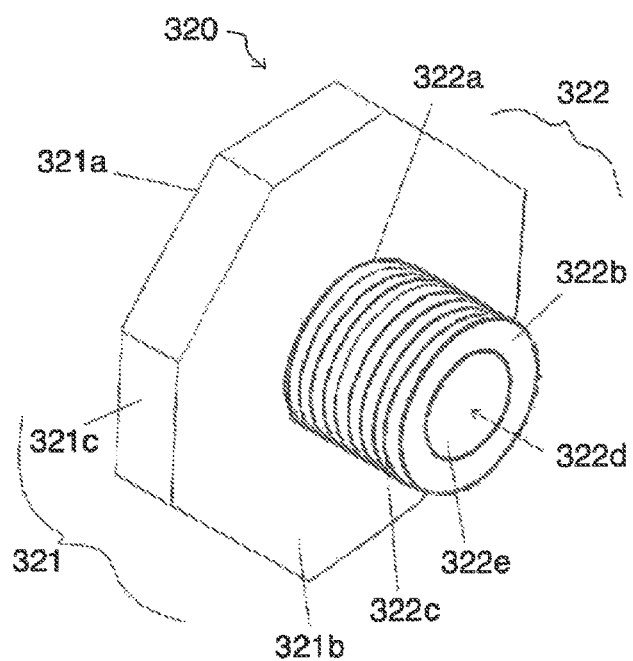
FIG. 10B illustrates an isometric bottom view of a forward nut, according to another exemplary embodiment of the present general inventive concept.

FIG. 10B illustrates an isometric bottom view of a forward nut 320, according to another exemplary embodiment of the present general inventive concept.

Referring to FIGS. 10A through 10B, the forward nut 320 may include a front portion 321 and a stub portion 322, but is not limited thereto.

Referring to FIG. 10A, the front portion 321 is illustrated to have an octagonal shape. However, the front portion 321 may be rectangular prism, rectangular, circular, pentagonal, hexagonal, or any other shape known to one of ordinary skill in the art, but is not limited thereto.

Referring to FIG. 10A, the front portion 321 may include a front surface 321a, a rear surface 321b, an octagonal surface 321c, a front aperture 321d, and a plurality of internal threads 321e, but is not limited thereto.

Referring to FIG. 10B, the stub portion 322 may include a first end 322a, a second end 322b, a plurality of external threads 322c, a rear aperture 322d, and a non-threaded inner surface 322e, but is not limited thereto.

Referring to FIGS. 10A through 10B, the front aperture 321d may be disposed at a portion of a center of the front portion 321. Furthermore, the front aperture section 321d may be substantially larger in diameter with respect to the diameter of the rear aperture 322d and may extend across at least a portion of a length of the front portion 321, beginning from the front surface 321a and terminating at a juncture of the rear surface 321b and the first end 322a. The rear aperture 322d may be disposed at a portion of a center of the stub portion 322. Additionally, the rear aperture 322d may extend across at least a portion of the length of the stub portion 322, beginning from the second end 322b and terminating at the juncture of the rear surface 321b and the first end 322a.

The front aperture 321d may be larger than the rear aperture 322d, in order to allow the third section 315 including the plurality of external threads 315c to slide therethrough without being stopped by and/or interfering with the plurality of internal threads 321e. Also, the non-threaded inner surface 322e allows the third section 315 including the plurality of external threads 315c to slide through an entirety of the stub portion 322, such that an end portion of the third section 315 protrudes outside from a back end of the stub portion 322.

The plurality of internal threads 321e may be disposed within the front aperture 321d. The plurality of external threads 322c may be disposed on at least a portion of the stub portion 322. The plurality of external threads 322c may be oriented in the second direction, but are not limited thereto.

Alternatively, the plurality of external threads 322c may be oriented in the first direction, but are not limited thereto.

The square flange bolt 310 may be used to affix and/or adhere a first object to a second object. Specifically, the user may arrange the square flange bolt 310 on one side of the first object that is placed next to the second object and placing the forward nut 320 on the opposite end with respect to the square flange bolt 310 protruding from the first object and the second object. More specifically, the user may affix and/or adhere the forward nut 320 to the square flange bolt 310. The user may grasp the forward nut 320 via at least a portion of the front portion 321 and/or at least a portion of the stub portion 322. The user may orient the forward nut 320, such that the front surface 321a and the front aperture 321d are facing the rear end 310b. Subsequently, the front aperture 321d may be moved laterally toward the rear 310b and maneuvered to encapsulate at least a portion of the square flange bolt 310. As such, the front aperture 321d may receive the third section 315, first, followed by the second section 314, and at least a portion of the first section 313.

The rear aperture 322d may have diameter that is slightly larger than the diameter of the third section 315.

The front aperture 321d may have substantially the same diameter as the diameter of the first section 313. As such, the front aperture 321d may no longer be moved laterally over the first section 313. Moreover, upon contact of the front aperture 321d with the second end 313b of the first section 313, the user may rotate the forward nut 320 in the first direction, such that the plurality of internal threads 321e are interwoven corresponding to the plurality of external threads 313c. Thus, the forward nut 320 and the square flange bolt 310 may be considered interlocked.

Referring to FIGS. 4 and 10A through 10B, the user may affix and/or adhere the aft nut 130 to the forward nut 320. The user may grasp the aft nut 130 via at least a portion of the front portion 131 and/or at least a portion of the stub portion 132. Specifically, the user may grasp the knurled surface 132c via at least a portion of the stub portion 132. The user may orient the aft nut 130, such that the front surface 131a and the front aperture 131d are facing the rear surface 321b of the forward nut 320. Subsequently, the front aperture 131d may be moved laterally toward the rear surface 321b of the forward nut 320 and maneuvered to encapsulate at least a portion of the square flange bolt 310 and the forward nut 320. In other words, the front aperture 131d may be positioned and moved by the user, such that as the user may move the aft nut 130 towards the rear surface 321b of the forward nut 320. As such, the front aperture 131d may receive the third section 315, first, followed by at least a portion of the second section 314.

Referring to FIGS. 4 and 9, the rear aperture 132d may have a diameter that is slightly smaller than the diameter of the third section 315. As such, at least a portion of the rear aperture 131d may no longer be moved laterally over the third section 315. Moreover, upon contact of the rear aperture 132d with the second end 315b of the third section 315, the user may rotate the aft nut 130 in the second direction, such that the plurality of internal threads 132e are interwoven corresponding to the plurality of external threads 315c that are disposed outside the stub portion 322.

The front aperture 131d may have substantially the same diameter as the diameter of the stub portion 322 of the forward nut 320. As such, the front aperture 131d may no longer be moved laterally over the stub portion 322. Moreover, upon contact of the front aperture 131d with the second end 322b of the stub portion 322, the user may rotate the aft nut 130 in the second direction such that the plurality of internal threads 131e are interwoven corresponding to the plurality of external threads 322c. The aft nut 130 may be rotated in the second direction until the front surface 131a has made substantial contact with the rear surface 321b of the forward nut 320 and there is substantial resistance to further rotation thereof. As such, the contact of the front surface 131a of the aft nut 130 and the rear surface 321b of the forward nut 320 may be near at least a portion of the second section 314 of the square flange bolt 310, such that it may be considered substantially at the center of the second section 314. Thus, the aft nut 130, the forward nut 320, and the square flange bolt 310 may be considered interlocked.

Figure 11:
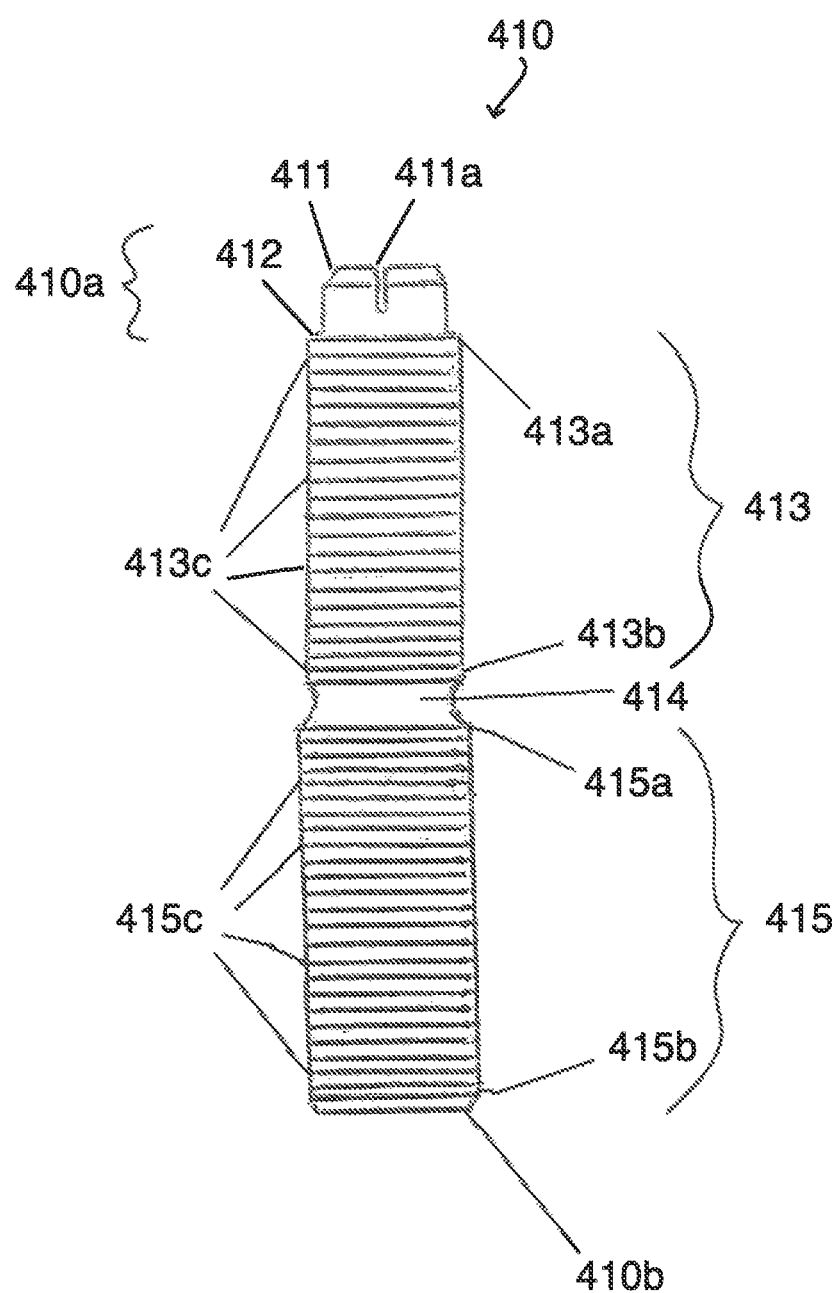
FIG. 11 illustrates side view of a square bolt, according to another exemplary embodiment of the present general inventive concept.

FIG. 11 illustrates an isometric view of a square bolt 410, according to another exemplary embodiment of the present general inventive concept.

Although, the square bolt 410 is illustrated to be a bolt type fastener, the square bolt 410 may be at least one of a nail, a screw, a pin, a peg, a rivet, a threaded insert, and a threaded rod, etc., but is not limited thereto.

The square flange bolt 410 may include a front end 410a, a rear end 410b, a head 411, an intermediary surface 412, a first section 413, a second section 414, and a third section 415, but is not limited thereto.

Referring to FIG. 11, the head 411 is illustrated to have a rectangular prism shape. However, the head 411 may be rectangular, circular, pentagonal, hexagonal, octagonal, or any other shape known to one of ordinary skill in the art, but is not limited thereto.

The head 411 may include at least one screwdriver-receiving groove 411a, but is not limited thereto.

The head 411 may be of any predetermined size to include the at least one screwdriver-receiving groove 411a of any predetermined size. The at least one screwdriver-receiving groove 411a may receive at least one of a Phillips-head screwdriver and a flat-head screwdriver, etc., but is not limited thereto. Furthermore, the head 411 may receive at least one of a socket wrench and a torque wrench, etc., but is not limited thereto.

The first section 413 may include a first end 413a, a second end 413b, and a plurality of external threads 413c, but is not limited thereto.

The third section 115 may include a first end 415a a second end 415b, and a plurality of external threads 415c, but is not limited thereto.

Referring to FIGS. 6 through 7A, the first section 413 may be substantially larger in diameter with respect to the diameter of the second section 414 and the diameter of the third section 415. The plurality of external threads 413c may be disposed on at least a portion of the first section 413. The plurality of external threads 413c may be oriented in a first direction (e.g., clockwise), but are not limited thereto. Alternatively, the plurality of external threads 413c may be oriented in a second direction (e.g., counterclockwise), but are not limited thereto. The second section 414 may be a substantially smooth surface, but is not limited thereto. The plurality of external threads 415c may be disposed on at least a portion of the third section 415. The plurality of external threads 415c may be oriented in the second direction, but are not limited thereto. Alternatively, the plurality of external threads 415c may be oriented in the first direction, but are not limited thereto. The rear end 410b may be shaped by at least one of tapered, pointed, flat, etc., but is not limited thereto.

Alternatively, the first section 413 may also be referred to as the first threaded portion 413, and the third section 415 may also be referred to as the second threaded portion 415, for at least the reason that the first section 413 includes the plurality of external threads 413c, and the third section 415 includes the plurality of external threads 415c.

Alternatively, the second section 414 may also be referred to as a non-threaded portion 414, for at least the reason that the second section 414 does not include any threading. Also, the second section 414 may be an optional portion of the square flange bolt 410, and may be excluded from the square flange bolt 410 based on a manufacturer's preference.

Referring to FIGS. 10A through 11, the user may affix and/or adhere the forward nut 320 to the square bolt 410. The user may grasp at least one of a portion of the front end 410a, a portion of the first section 413, a portion of the second section 414, and a portion of the third section 415 to apply a lateral force to the square bolt 410 into the forward nut 320 via the front aperture 321d. The user may grasp the forward nut 320 via at least a portion of the front portion 321 and/or at least a portion of the stub portion 322. The user may orient the forward nut 320, such that the front surface 321a and the front aperture 321d are facing the head 411. Subsequently, the front aperture 321d may be moved laterally toward the head 411 and maneuvered to encapsulate at least a portion of the square bolt 410. As such, the front aperture 321d will first receive the first section 413, followed by the second section 414, and at least a portion of the third section 415.

The user may affix and/or adhere the forward nut 320 to the square bolt 410. The user may grasp the forward nut 320 via at least a portion of the front portion 321 and/or at least a portion of the stub portion 322.

The rear aperture 322d may have substantially the same diameter as the diameter of the first section 413. As such, at least a portion of the rear aperture 322d may no longer be moved laterally over the first section 413. Moreover, upon contact of the rear aperture 322d with the first end 413a of the first section 413, the user may rotate the forward nut 320 in the first direction, such that the plurality of internal threads 322e are interwoven corresponding to the plurality of external threads 413c.

The front aperture 321d may have substantially the same diameter as the diameter of the third section 415. As such, the front aperture 321d may no longer be moved laterally over the first section 415. Moreover, upon contact of the front aperture 321d with the first end 415a of the third section 415, the user may rotate the forward nut 320 in the second direction such that the plurality of internal threads 321e are interwoven with the plurality of external threads 415c. The forward nut 320 may be rotated in the first direction until the square bolt 410 protrudes from the second end 322b and/or as desired by the user. Thus, the forward nut 320 and the square bolt 410 may be considered interlocked.

Referring to FIGS. 4 and 10A through 11, the user may affix and/or adhere the aft nut 130 to the combination of the square bolt 410 and the forward nut 320. The user may grasp the aft nut 130 via at least a portion of the front portion 131 and/or at least a portion of the stub portion 132. Specifically, the user may grasp the knurled surface 132c via at least a portion of the stub portion 132. The user may orient the aft nut 130, such that the front surface 131a and the front aperture 131d are facing the rear surface 321b of the forward nut 320. Subsequently, the front aperture 131d may be moved laterally toward the rear surface 321b of the forward nut 320 and maneuvered to encapsulate at least a portion of the square bolt 410 and the forward nut 320. In other words, the front aperture 131d may be positioned and moved by the user, such that as the user may move the aft nut 130 towards the rear surface 321b of the forward nut 320. As such, the front aperture 131d may receive the first section 413, first, followed by at least a portion of the second section 414.

Referring to FIGS. 4 and 10A through 11, the rear aperture 132d may have substantially the same diameter as the diameter of the first section 413. As such, at least a portion of the rear aperture 131d may no longer be moved laterally over the first section 413. Moreover, upon contact of the rear aperture 132d with the first end 413a of the first section 413, the user may rotate the aft nut 130 in the first direction, such that the plurality of internal threads 132e are interwoven corresponding to the plurality of external threads 413c.

The front aperture 131d may have substantially the same diameter as the diameter of the stub portion 322 of the forward nut 320. As such, the front aperture 131d may no longer be moved laterally over the stub portion 322. Moreover, upon contact of the front aperture 131d with the second end 322b of the stub portion 322, the user may rotate the aft nut 130 in the first direction such that the plurality of internal threads 131e are interwoven corresponding to the plurality of external threads 322c. The aft nut 130 may be rotated in the first direction until the front surface 131a has made substantial contact with the rear surface 321b of the forward nut 320 and there is substantial resistance to further rotation thereof. As such, the contact of the front surface 131a of the aft nut 130 and the rear surface 321b of the forward nut 320 may be near at least a portion of the second section 414 of the square bolt 410, such that it may be considered substantially at the center of the second section 414. Thus, the aft nut 130, the forward nut 320, and the square bolt 410 may be considered interlocked.

The combination of the square bolt 410, the forward nut 320, and the aft nut 130 may be used to affix and/or adhere an object to a wall. Specifically, the user may move the combination of the square bolt 410, the forward nut 320, and the aft nut 130, such that the rear end 410b and the front surface 320a are facing the object and wall and are disposed on the wall.

Referring to FIGS. 1 through 5, the first section 113 of the square flange bolt 110 may include the plurality of external threads 113c oriented in a counterclockwise direction. The forward nut 120 may include the plurality of internal threads 121e oriented in a counterclockwise direction and the plurality of internal threads 122e oriented in a counterclockwise direction. The plurality of external threads 113c correspond to the plurality of internal threads 121e, such that the user may rotate the forward nut 120 around the first section 113 in a counterclockwise direction in response to the front aperture 121d being directed to encase the first section 113. In other words, the plurality of external threads 113c may be interwoven corresponding to the plurality of internal threads 121e. Concordantly, the aft nut 130 may include the plurality of internal threads 131e oriented in a counterclockwise direction and the plurality of internal threads 132e oriented in a counterclockwise direction. The plurality of external threads 115c correspond to the plurality of internal threads 132e, such that the user may move the rear aperture 132d to encase the third section and rotate the aft nut 130 around the third section 115 in a counterclockwise direction. In other words, the plurality of external threads 115c may be interwoven corresponding to the plurality of internal threads 132e. Moreover, the diameter of the first section 113 near the flange 112 may have a substantially larger diameter than the third section 115. Additionally, the first section 113 and the third section may be separated by a second section 114, which may be smaller in size with respect to the first section 113 and the third section 115. The stub portion 122 of the forward nut 120 may receive the front portion 131 of the aft nut 130. The rear surface 121b may be in substantial contact with the front surface 131a at a portion of the second section 114, such that it may be considered a center of the second section 114. The head 111 of the square flange bolt 110 may include at least one screwdriver-receiving groove 111a that may receive at least one of a Phillips-head screwdriver, flat head screwdriver, and a socket wrench, but is not limited thereto.

Referring to FIGS. 1 through 5, the forward nut 120 may include the plurality of internal threads 121e oriented in a counterclockwise direction. The diameter of the front aperture 121d may be substantially similar to the diameter of the first section 113 of the square flange bolt 110. The plurality of external threads 113c correspond to the plurality of internal threads 121e, such that the user may rotate the forward nut 120 around the first section 113 in a counterclockwise direction in response to the front aperture 121d being directed to encase the first section 113. In other words, the plurality of external threads 113c may be interwoven corresponding to the plurality of internal threads 121e. The first object 10 and the second object 20 may be affixed and/or adhered using the square flange bolt 110 and the forward nut 120. The user may laterally direct the square flange bolt 110 through the hole 15. The third section 115 may protrude first, followed by the second section 114, and at least a portion of the first section 113. Moreover, the square flange bolt 110 may be supported by the flange 112 due to the bearing surface 112b in substantial contact with the front surface 10a of the first object 10. The forward nut 120 may be affixed and/or adhered on the rear surface 22b of the second object 20 via the first section 113 and the third section 115. The stub portion 122 of the forward nut 120 may receive the front portion 131 of the aft nut 130.

Referring to FIGS. 1 through 5, the stub portion 122 of the forward nut 120 may receive the front portion 131 of the aft nut 130. The front portion 131 of the aft nut 130 may include the front aperture 131d and the plurality of internal threads 131e oriented in a counterclockwise direction. The stub portion 122 of the forward nut 120 may include the plurality of external threads 122c oriented in a counterclockwise direction. The diameter of the front aperture 131d may be substantially the same in diameter as the stub portion 122 of the forward nut 120. Additionally, the user may laterally move the front aperture 131d towards the stub portion 122. As such, the user may interconnect the front portion 131 of the aft nut 130 with the stud portion 122 of the forward nut 120 by rotating the aft nut 130 in a counterclockwise direction, such that the plurality of internal threads 132e are interwoven with the corresponding plurality of external threads 122c. Moreover, the aft nut 130 may include the plurality of internal threads 131e oriented in a counterclockwise direction and the plurality of internal threads 132e oriented in a counterclockwise direction. The plurality of external threads 115c correspond to the plurality of internal threads 132e, such that the user may move the rear aperture 132d to encase the third section and rotate the aft nut 130 around the third section 115 in a counterclockwise direction. In other words, the plurality of external threads 115c may be interwoven with the plurality of internal threads 132e. The stub portion 132 may include the knurled surface 132c to allow the user to grasp the stub portion 132 due to the knurled surface 132c being a textured surface.

Referring to FIGS. 6 through 8, the square bolt 210 may function differently than the square flange bolt 110. The head 211 of the square bolt 210 may be directed toward the front surface 121a of the forward nut 120. Additionally, the first section 213 of the square bolt 210 may be substantially smaller in diameter than the front aperture 121d. As such, the first section 213 may move through the front aperture 121d until it reaches the rear aperture 122d. The rear aperture 122d may be substantially similar in diameter to the diameter of the first section 213. As such, the user may rotate the forward nut 120 in the counterclockwise direction to interweave the plurality of internal threads 122e with the plurality of external threads 213c. Furthermore, the user may continue to rotate the forward nut 120 until at least a portion of the square bolt 210 protrudes from the second end 132b.

Moreover, the user may direct the stub portion 122 of the forward nut 120 toward the front surface 131a of the aft nut 130. Additionally, the first section 213 of the square bolt 210 may be substantially smaller in diameter than the front aperture 131d. As such, the first section 213 may move through the front aperture 131d until it reaches the rear aperture 132d. The rear aperture 132d may be substantially similar in diameter to the diameter of the first section 213. As such, the user may rotate the aft nut 130 in the counterclockwise direction to interweave the plurality of internal threads 132e with the plurality of external threads 213c. Furthermore, the user may continue to rotate the aft nut 130 until at least a portion of the square bolt 210 protrudes from the second end 132b.

Concordantly, the third section 215 of the square bolt 210 may be substantially similar in diameter to the diameter of the front aperture 131d. As such, the user may rotate the aft nut 130 in the counterclockwise direction to interweave the plurality of internal threads 131e corresponding to the plurality of external threads 215c.

The anti-vibration fastener 200 may be used when the user lacks access to a rear portion of an object and/or the object needs to be affixed and/or adhered to a front surface of the object and/or a wall. As such, the diameter of the first section 213 and the diameter of the third section 215 may be reversed on the square bolt 210, which corresponds respectively to the diameter of the third section 115 and the diameter of the first section 113 on the square flange bolt 110. Moreover, the second section 214 of the square bolt 210 and the second section 114 of the square flange bolt 110 may be similar in construction, such that those portions are a non-threaded space between the first and third sections. The head 211 of the square flange bolt 210 may include at least one screwdriver-receiving grooves 211a that may receive at least one of a Phillips-head screwdriver, flat head screwdriver, and a socket wrench, but is not limited thereto.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An anti-vibration fastener, comprising:
a bolt with a square-shaped head to affix a first object to a second object, the bolt with the square-shaped head comprising:
a first threaded portion disposed at a front end of the bolt with the square-shaped head, the first threaded portion comprising:
a plurality of external threads oriented in a first direction, and
a second threaded portion disposed at a rear end of the bolt with the square-shaped head having a diameter smaller than a diameter of the first threaded portion, the second threaded portion comprising:

a plurality of external threads oriented in a second direction;

a forward nut to encapsulate at least a portion of the bolt with the square-shaped head such that the first object and the second object are disposed between the forward nut and the front end of the bolt with the square-shaped head, the forward nut comprising:

a front portion, comprising:

a front aperture disposed at substantially center portion of the front portion to receive at least a portion of the first threaded portion therein, the front aperture having a diameter substantially similar to the diameter of the first threaded portion, and a plurality of internal threads disposed within an inner surface of the front aperture oriented in the first direction to correspond to and interweave with the plurality of external threads of the first threaded portion, and a stub portion connected to the front portion of the forward nut, the stub portion comprising:

a rear aperture disposed at a substantially center portion of the stub portion to receive at least a portion of the second threaded portion, the rear aperture having a diameter larger than the diameter of the second threaded portion, and a non-threaded inner surface disposed within the rear aperture to receive the plurality of external threads of the second threaded portion; and an aft nut to encapsulate at least a portion of the bolt with the square-shaped head and the forward nut.

2. The anti-vibration fastener of claim 1, wherein the bolt with the square-shaped head further comprises:

a non-threaded portion disposed between the first threaded portion and the second threaded portion to separate the first threaded portion from the second threaded portion.

3. The anti-vibration fastener of claim 1, wherein the stub portion further comprises:

a plurality of external threads disposed on an external surface of the stub portion of the forward nut.

4. The anti-vibration fastener of claim 3, wherein the aft nut further comprises:

a front portion, comprising:

a front aperture disposed at a portion of a center of the front portion to receive at least a portion of the stub portion of the forward nut and having a diameter substantially similar to the diameter of the stub portion of the forward nut, and a plurality of internal threads disposed within the front aperture oriented in the second direction to interweave with the plurality of external threads disposed on the stub portion of the forward nut.

5. The anti-vibration fastener of claim 4, wherein the aft nut further comprises:

a stub portion, comprising:

a rear aperture disposed at a portion of a center of the stub portion to receive at least a portion of the second threaded portion and having a diameter substantially similar to the diameter of the second threaded portion, and a plurality of internal threads disposed within the rear aperture oriented in the second direction to interweave with the plurality of external threads on the second threaded portion.

* * * * *